United States Patent Office 3,597,254
Patented Aug. 3, 1971

3,597,254
BLUE DYE MIXTURES
Fritz Graser, Ludwigshafen, and Guenther Riedel, Mannheim, Germany, assignors to Badische Anilin- & Soda-Fabrik Aktiengesellschaft, Ludwigshafen (Rhine), Germany
No Drawing. Filed Oct. 2, 1968, Ser. No. 764,629
Claims priority, application Germany, Oct. 3, 1967, P 16 44 482.9
Int. Cl. C07c *97/12;* C08h *17/66;* C10l *1/12*
U.S. Cl. 106—288Q
3 Claims

ABSTRACT OF THE DISCLOSURE

Blue dye mixtures which are outstandingly suitable for coloring mineral oils and gasolines and which comprise at least three different 1,4-diaminoanthraquinone derivatives whose amino groups bear hydrocarbon radicals and hydrocarbon radicals containing ether groups as substituents.

---

This invention relates to blue dye mixtures suitable for coloring gasoline and mineral oil.

Concentrated solutions of dyes in solvents, known as stock solutions, on which many different requirements are placed are conventionally used for coloring mineral oils and gasolines. Thus dye stock solutions should have the highest possible content of dye and high tinctorial strength, they should be stable at low temperatures, i.e. they should neither separate into their components nor solidify upon prolonged exposure to cold, and they should dissolve with the least possible residue in gasolines or mineral oils.

Blue dyes hitherto used for coloring gasoline or mineral oil have only fulfilled these requirements inadequately, and the tinctorial strength of the corresponding stock solutions thus leaves much to be desired. The dyes often crystallize out from the stock solutions in the cold and do not redissolve immediately upon reheating.

There is therefore a need for blue dyes for coloring gasolines and mineral oils which exhibit the required properties such as high tinctorial strength and very good resistance to low temperatures. This need is fulfilled by the present invention to a large extent.

The invention relates to new blue dye mixtures which contain at least three different anthraquinone derivatives having the general Formula I:

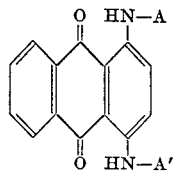

(I)

the radicals A and A' in the Formula I denoting identical or different linear or branched hydrocarbon radicals which may bear ether groups as substituents and which have up to fourteen carbon atoms, and of the anthraquinone derivatives having the Formula I of the mixture at least one contains different radicals A and A', at least one contains identical radicals A and A' and at least two contain in at least one radical A or A' at least one ether group.

For example dye mixtures are suitable which contain three dyes having the Formulae IV, V and VI:

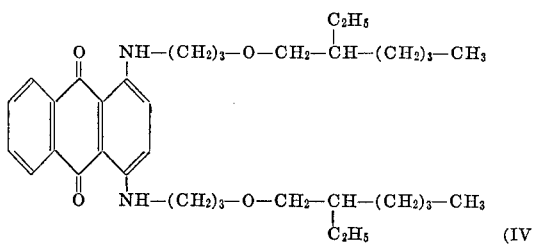

(IV)

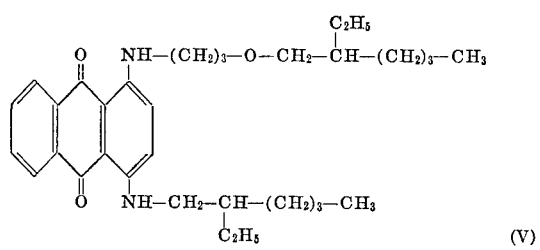

(V)

and

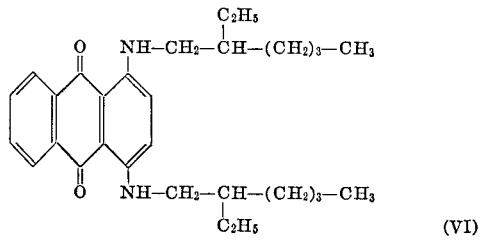

(VI)

or which contain six dyes having the Formulae IV, V, VI, VII, VIII and IX:

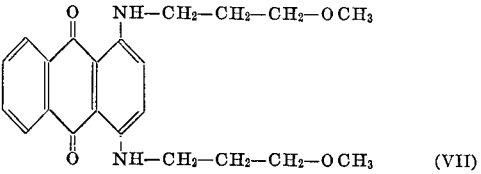

(VII)

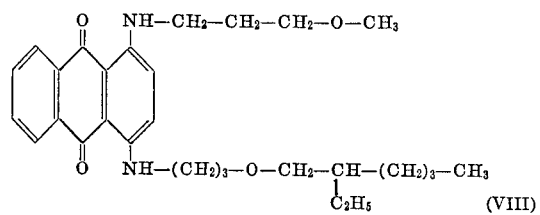

(VIII)

and

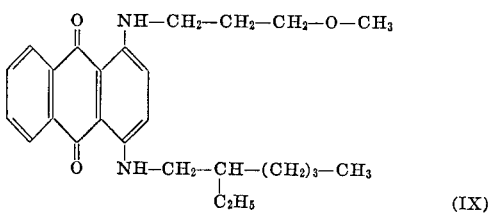

(IX)

The dye mixtures according to the invention are prepared for example by reacting a 1,4-dihydroxyanthraquinone or 1,4-diaminoanthraquinone (which may be wholly or partly present in leuco form) with a mixture of at least two different primary aliphatic amines of which at least one contains an ether group, at temperatures of up to 200° C., the total amount of amine used being at least twice the molar amount of anthraquinone derivative.

The mixtures of primary aliphatic amines to be used for the production of the new dyes may consist of any number, for example from 2 to 5, different amines. At least one amine of the amine mixture concerned should contain at least one ether group. Examples of primary aliphatic amines are linear or branched amines. It is preferred to use primary aliphatic amines which contain only one amino group and one hydrocarbon radical having up to fourteen carbon atoms, this hydrocarbon radical containing no substituents other than any ether bridges which may be present. The ether bridges may be at any position in the hydrocarbon radical, but those amines containing ether bridges are preferred which contain only one ether bridge and that especially on the carbon atom in the 3-position to the amino group. The following are examples of amines:

$$H_2N-CH_2-CH_2-CH_2-CH_3$$

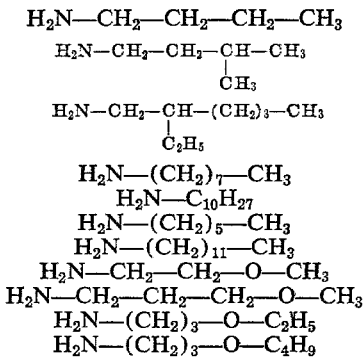

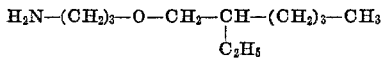

and $$H_2N-(CH_2)_3-O-CH_2-CH-(CH_2)_3-CH_3$$
$$\qquad\qquad\qquad\qquad\quad |$$
$$\qquad\qquad\qquad\qquad\;\, C_2H_5$$

Any mixtures of amines may be used for the production of the new dye mixtures provided at least one of the amine in the mixture contains at least one ether group. When using short chain amines having for example up to five carbon atoms it is advantageous to use with them in the mixture those having longer chains, for example six to fourteen carbon atoms. The relative proportions of the amines to each other may be varied within wide limits but the proportion of a single amine in the mixture should not exceed 90 mole percent and preferably should not exceed 80 mole percent. The proportion in the mixture of amines containing ether groups should not be less than 10 mole percent and preferably not less than 20 moles percent. Mixtures are preferred, however, in which the amines are contained in equimolar proportions or in proportions which do not differ much from equimolar proportions. For example the following amine mixtures may be used:

| No. | Amines of the mixture | Molar ratio |
|---|---|---|
| 1 | $H_2N-CH_2-CH(C_2H_5)-(CH_2)_3-CH_3$<br>$H_2N-(CH_2)_3-O-CH_2-CH(C_2H_5)-(CH_2)_3-CH_3$ | 1:1 |
| 2 | $H_2N-CH_2-CH(C_2H_5)-(CH_2)_3-CH_3$<br>$H_2N-(CH_2)_3-O-CH_2-CH(C_2H_5)-(CH_2)_3-CH_3$ | 2:1 |
| 3 | $H_2N-CH_2-CH(C_2H_5)-(CH_2)_3-CH_3$<br>$H_2N-(CH_2)_3-O-CH_2-CH(C_2H_5)-(CH_2)_3-CH_3$ | 3:1 |
| 4 | $H_2N-CH_2-CH(C_2H_5)-(CH_2)_3-CH_3$<br>$H_2N-(CH_2)_3-O-CH_3$ | 1:1 |
| 5 | $H_2N-CH_2-CH(C_2H_5)-(CH_2)_3-CH_3$<br>$H_2N-(CH_2)_2-O-CH_3$ | 1:1 |
| 6 | $H_2N-CH_2-CH(C_2H_5)-(CH_2)_3-CH_3$<br>$H_2N-(CH_2)_3-O-C_2H_5$ | 1:1 |
| 7 | $H_2N-(CH_2)_3-CH_3$<br>$H_2N-(CH_2)_3-O-CH(C_2H_5)-(CH_2)_3-CH_3$ | 1:1 |
| 8 | $H_2N-(CH_2)_3-O-CH_3$<br>$H_2N-(CH_2)_3-O-CH_2-CH(C_2H_5)-(CH_2)_3-CH_3$ | 1:1 |
| 9 | $H_2N-(CH_2)_3-O-CH_2-CH(C_2H_5)-(CH_2)_3-CH_3$<br>$H_2N-(CH_2)_3-O-C_2H_5$ | 1:1 |
| 10 | $H_2N-(CH_2)_3-CH_3$<br>$H_2N-(CH_2)-CH(C_2H_5)-(CH_2)_3-CH_3$ | 1:1:1 |
| 11 | $H_2N-CH_2-CH(C_2H_5)-(CH_2)_3-CH_3$<br>$H_2N-(CH_2)_3-O-CH_2-CH(C_2H_5)-(CH_2)_3-CH_3$<br>$H_2N-(CH_2)_3-O-CH_3$ | 1:1:1 |
| 12 | $H_2N-CH_2-CH(C_2H_5)-(CH_2)_3-CH_3$<br>$H_2N-(CH_2)_3-O-CH_2-CH(C_2H_5)-(CH_2)_3-CH_3$<br>$H_2N-(CH_2)_3-O-C_2H_5$ | 1:1:1 |
| 13 | $H_2N-CH_2-CH(C_2H_5)-(CH_2)_3-CH_3$<br>$H_2N-(CH_2)_3-CH_3$<br>$H_2N-(CH_2)_3-O-CH_3$ | 1:1:1 |
| 14 | $H_2N-(CH_2)_3-CH_3$<br>$H_2N-(CH_2)_3-O-CH_3$<br>$H_2N-(CH_2)_3-O-CH_2-CH(C_2H_5)-(CH_2)_3-CH_3$ | 1:1:1 |
| 15 | $H_2N-(CH_2)_3CH_3$<br>$H_2N-(CH_2)_3-O-CH_3$<br>$H_2N-CH_2-CH(C_2H_5)-(CH_2)_3-CH_3$<br>$H_2N-(CH_2)_3-O-CH_2-CH(C_2H_5)-(CH_2)_3-CH_3$ | 1:1:1:1 |
| 16 | $H_2N-(CH_2)_3-CH_3$<br>$H_2N-(CH_2)_2-CH(CH_3)-CH_3$<br>$H_2N-(CH_2)_3-O-CH_3$<br>$H_2N-CH_2-CH(C_2H_5)-(CH_2)_3-CH_3$<br>$H_2N-(CH_2)_3-O-CH_2-CH(C_2H_5)-(CH_2)_3-CH_3$ | 1:1:1:1:1 |

| No. | Amines of the mixture | Molar ratio |
|---|---|---|
| 17 | $H_2N-CH_2-\underset{\underset{C_2H_5}{\mid}}{CH}-(CH_2)_3-CH_3$<br>$H_2N-(CH_2)_3-O-CH_2-\underset{\underset{C_2H_5}{\mid}}{CH}-(CH_2)_3-CH_3$<br>$H_2N-(CH_2)_3-O-(CH_2)_3-CH_3$ | 1:1:1 |

The anthraquinone derivatives may if desired be used wholly or partly in their leuco form for the reaction for the production of the new dye mixtures. The leuco compounds may also be prepared from the anthraquinone derivatives and reducing agents such as zinc dust or hydrochloric acid and zinc dust during the reaction by a conventional method.

The amine itself may serve as a solvent during the reaction. It is advantageous, however, to carry out the reaction in solvents which do not react under the reaction conditions with the reactants. Examples of suitable solvents are methanol, ethanol, isobutanol or hydrocarbons, for example aromatic hydrocarbons such as benzene, toluene, xylene, or halohydrocarbons such as chlorobenzene and dichlorobenzene. Mixtures of solvents may also be used.

The reaction takes place at temperatures up to 200° C. It is preferable to use temperatures of from 50° to 120° C. The amount of amine required for the reaction has no upper limit. Thus for example up to 100 moles of amine mixture may be used to 1 mole of anthraquinone derivative, but the range of from 2 to 3 moles of amine mixture is preferred.

When leuco compounds of the anthraquinone derivatives are used, in order to achieve a complete oxidation of the leuco form to the keto form after reaction with the amines, it may be advantageous for the reaction product to be treated for example in nitrobenzene at temperatures of from 100° to 210° C. with piperidine or for air to be passed into the reaction mixture for example at the end of the reaction at temperatures of from 60° to 150° C. The latter method is much preferred. Complete reaction to the new dye mixtures can be confirmed by chromatographic tests on a sample withdrawn from the reaction mixture. Water formed during the reaction is advantageously removed at the end of the reaction, for example by azeotropic distillation, if necessary through a water separator. The dye mixture formed is usually not isolated but taken up at once in the solvents conventionally used and converted thus into the dye stock solutions. This may be done by removing the solvent used for the reaction, for example by distillation, at the end of the reaction and dissolving the residual dye mixture in the desired solvent. It is naturally most advantageous to use as the solvent for the reaction the solvent which it is desired to use for the preparation of the stock solution. Any insoluble constituents formed when zinc dust is used or present in the starting material may be removed for example by filtration.

The new blue dye mixtures consist of a plurality of compounds having the Formula I depending on the number of amines used in the reaction; for example when using two amines they consist of three compounds, when using three amines of six compounds and when using four amines of ten compounds, and so on. Thus for example the dye mixture of Example 6 consists of the six dyes having the Formulae IV, V, VI, VII, VIII and IX. The new dye mixtures mix well with many organic solvents and may therefore be used for coloring these solvents. The dyes are also suitable for coloring waxes, surface coating agents and for the production of printing inks. They are very well suited in particular for coloring gasolines or mineral oils. For this purpose they are converted by dissolving them in suitable solvents, for example aromatic hydrocarbons such as toluene, into stock solutions which in turn are used for coloration.

Combination shades may be prepared by mixing the dye mixtures with dyes of other colors.

Blue dye mixtures according to this invention have superior tinctorial strength and resistance to cold to the dyes or dye mixtures hitherto used for coloring gasolines and mineral oils.

In order to be able to measure the tinctorial strength between dyes of this type it is possible for example to proceed by making a colorimetric comparison of the stock solutions of the dyes with a standard dye. The dye C.I. Solvent Blue 35 in the form of 100% powder is suitable for example as a standard dye. To determine resistance to cold, the stock solutions may be left for a long period, for example up to four weeks, in a refrigerator at from —16° to —20° C. The stock solution should either remain unchanged or the crystals which separate from the solution should immediately pass into solution again when warmed to room temperature.

With the conventional blue dyes or mixtures of blue dyes hitherto used for coloring gasolines and mineral oils it is only possible to achieve tinctorial strengths which do not exceed the ratio 100:33, i.e. 100 parts by weight of the concentrated stock solution corresponds in tinctorial strength to 33 parts by weight of C.I. Solvent Blue 35. Furthermore the cold tests of these dyes give inadequate values.

For example if the dyes known from French patent specification No. 1,456,232 are subjected to a cold test at —16° C. in the form of stock solutions having a tinctorial strength ratio of 100:33 measured by the above-mentioned method, the dye crystallizes out after a short time and only passes slowly into solution again when heated. The dye mixture known from Example 4 of U.S. patent specification No. 3,164,449 in the form of a stock solution (solvent toluene) which has a tinctorial strength ratio of 100:20 measured by the above method also far from satisfies the required behavior in the cold test, and the dye mixtures described in Example 5 of U.S. patent specification No. 3,164,449 solidify even at room temperature from a stock solution in toluene at a tinctorial strength ratio of 100:12.

On the contrary, stock solutions can be prepared with the dye mixtures according to this invention which in most cases have a considerably higher tinctorial strength and which surprisingly have excellent resistance to cold.

The remarkably high resistance to cold of the stock solutions obtainable with the dye mixtures in accordance with this invention is surprising. If a mixture of two different aliphatic amines neither of which contains an ether group, for example an equimolar mixture of the amines having the formulae:

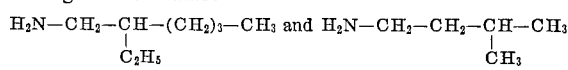

is used instead of the amines specified above for the production of the dye mixture, a stock solution of the dye mixture thus obtained (in toluene) shows marked crystallization in a cold test at —18° C. after a residence time of a few hours at a tinctorial strength ratio of 100:35.

The invention is illustrated by the following examples. The parts and percentages specified in the examples are by weight.

EXAMPLE 1

A mixture of 24 parts of 1,4-dihydroxyanthraquinone, 6.2 parts of leuco-1,4-diaminoanthraquinone, 25.5 parts of 3 - (2'-ethylhexoxy)-propylamine, 17.6 parts of 2-ethylhexylamine and 180 parts of isobutanol is heated under reflux for sixteen hours. Then while the reaction mixture is boiling, air is passed through for four hours and the solvent isobutanol is then distilled off at atmospheric or subatmospheric pressure. 62 parts of a viscous dye is obtained which according to the chromatogram is a mixture of three blue anthraquinone derivatives having the Formulae IV, V and VI. The dye mixture is eminently suitable for dyeing gasolines and mineral oils. For the purpose of coloring, the dye mixture is brought into solution with 33 parts of toluene. A stock solution is thus obtained having a dye content of about 65%. To determine the tinctorial strength, this stock solution is compared colorimetrically with C.I. Solvent Blue 35. It is found that 100 parts of stock solution are equivalent to 40 parts of C.I. Solvent Blue 35 in tinctorial strength. This stock solution dissolves completely in gasolines and mineral oils and has excellent cold stability. When stored at −18° C. it remains completely unchanged for a period of twenty-five days.

The isobutanol may be removed by steam distillation instead of distilling it off as described above. The residue which remains then has to be freed from water, for example by decantation and drying. If a stock solution is prepared from the dye mixture of this example by dissolving it in 21 parts of toluene to give a dye content of about 75%, the tinctorial strength of about 100 parts of stock solution is equivalent to 50 parts of C.I. Solvent Blue 35. This very high tinctorial strength stock solution does exhibit crystallization after having been kept at −18° C. for fourteen days, but the crystals disappear immediately when the solution is warmed to room temperature.

When the procedure of Example 1 is followed, using however, the amine mixtures indicated in the following table, and stock solutions, of which 100 parts correspond in tinctorial strength to the amount of C.I. Solvent Blue 35 indicated, are prepared by dissolving the dye mixture in toluene, these stock solutions have excellent stability to cold in a cold test at −18° C. In the table E=Example No.; TS=tinctorial strength given in parts of Solvent Blue 35.

| E | Amine mixture | | TS |
|---|---|---|---|
| | Parts | Amine | |
| 2 | 12.2 | 3-methoxypropylamine | 45 |
| | 17.6 | 2-ethylhexylamine | |
| 3 | 12.2 | 3-methoxypropylamine | 45 |
| | 25.5 | 3-(2'-ethylhexoxy)-propylamine | |
| 4 | 14.1 | 3-ethoxypropylamine | 45 |
| | 17.6 | 2-ethylhexylamine | |
| 5 | 14.1 | 3-ethoxypropylamine | 45 |
| | | 3-(2'-ethylhexoxy)-propylamine | |
| 6 | 17.0 | 3-(2'-ethylhexoxy)-propylamine | 55 |
| | 11.8 | 2-ethylhexylamine | |
| | 8.1 | 3-methoxypropylamine | |
| 7 | 9.4 | 3-ethoxypropylamine | 50 |
| | 17.0 | 3-(2'-ethylhexoxy)-propylamine | |
| | 11.8 | 2-ethylhexylamine | |
| 8 | 11.8 | 2-ethylhexylamine | 50 |
| | 8.1 | 3-methoxypropylamine | |
| | 6.6 | n-Butylamine | |
| 9 | 17.0 | 3-(2'-ethylhexoxy)-propylamine | 50 |
| | 11.8 | 2-ethylhexylamine | |
| | 6.6 | n-Butylamine | |
| 10 | 12.7 | 3-(2'-ethylhexoxy)-propylamine | 50 |
| | 8.8 | 2-ethylhexylamine | |
| | 6.1 | 3-methoxypropylamine | |
| | 5.0 | n-Butylamine | |
| 11 | 10.2 | 3-(2'-ethylhexoxy)-propylamine | 50 |
| | 7.0 | 2-ethylhexylamine | |
| | 4.9 | 3-methoxypropylamine | |
| | 4.8 | Isoamylamine | |
| | 4.0 | n-Butylamine | |
| 12 | 11.9 | 3-n-butoxypropylamine | |
| | 17.0 | 3-(2'-ethylhexoxy)-propylamine | |
| | 11.8 | 2-ethylhexylamine | |

EXAMPLE 13

76 parts of zinc dust is introduced into a mixture of 355 parts of 3-(2'-ethylhexoxy)-propylamine and 245 parts of 2-ethylhexylamine at 40° to 45° C. A total of 380 parts of 1,4-dihydroxy-anthraquinone is then added in portions so that the temperature does not rise above 100° C. The temperature is allowed to fall to 50° to 60° C. and the whole is stirred for eighteen hours at this temperature. Then air is passed in at the same temperature for twenty hours. The leuco form of the dye is thus oxidized and at the same time water formed in the reaction is removed. The whole is allowed to cool to room temperature, 300 parts of toluene is added, the sludge of zinc and zinc oxide formed in the reaction is allowed to settle and the solution is filtered. A stock solution of the dye mixture is obtained by adding about 9% of toluene. 100 parts of this stock solution is equivalent in tinctorial strength to about 40 parts of C.I. Solvent Blue 35. The stock solution dissolves completely in gasoline and is very stable to cold (unchanged after fourteen days at −18° C.).

EXAMPLE 14

A mixture of 240 parts of 1,4-dihydroxyanthraquinone, 63 parts of leuco-1,4-diaminoanthraquinone, 255 parts of 3-(2'-ethylhexoxy)-propylamine, 176 parts of 2-ethylhexylamine and 160 parts of isobutanol is heated under reflux for sixteen hours. The reaction mixture is then kept boiling for four hours and air is passed through while using a descending condenser. About 35 parts of isobutanol distills over with the water of reaction. About 265 parts of toluene is added and from the dye mixture thus synthesized a dye stock solution containing toluene and isobutanol is obtained of which 100 parts is equivalent in tinctorial strength to about 40 parts of C.I. Solvent Blue 35. The dye solution is eminently soluble in gasolines and is very stable to cold.

EXAMPLE 15

A mixture of 240 parts of 1,4-dihydroxyanthraquinone, 63 parts of leuco-1,4-diaminoanthraquinone, 255 parts of 3 - (2'-ethylhexoxy)-propylamine, 176 parts of 2-ethylhexamine and 260 parts of toluene is heated under reflux for eight hours. The reaction mixture is kept boiling for four hours and air is passed through while using a descending condenser. About 130 parts of toluene distils off azeotropically with the water of reaction. By adding about 100 parts of toluene, a dye stock solution is obtained from the synthesized dyes mixture; it has a tinctorial strength of about 100:40 parts of C.I. Solvent Blue 35, it dissolves excellently in gasoline and is very resistant to cold (completely unchanged after sixteen days at −18° C.).

EXAMPLE 16

A mixture of 48 parts of 1,4-dihydroxyanthraquinone, 12.6 parts of leuco-1,4-diaminoanthraquinone, 35.6 parts of 3-(2'-ethylhexoxy)propylamine, 24.8 parts of 2-ethylhexylamine, 13.8 parts of n-butylamine, 36 parts of isobutanol and 39 parts of toluene is heated for sixteen hours under reflux. Air is then passed through the boiling mixture for four hours and the water of reaction is removed at the same time. After the dye mixture has been allowed to cool, a dye stock soltuion is prepared from it by adding toluene; the stock solution has a tinctorial strength of 100:50 parts of C.I. Solvent Blue 35. It dissolves very well in gasoline and has a very good resistance to cold.

We claim:

1. A blue dye mixture containing at least three different anthraquinone derivatives having the formula:

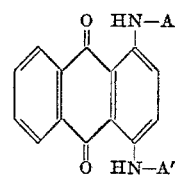

(I)

in which the radicals A and A' denote identical or different linear or branched hydrocarbon radicals having up to fourteen carbon atoms which may bear ether groups as substituents and of the anthraquinone derivatives having the Formula I of the mixture at least one contains different radicals A and A', at least one contains identical radicals A and A' and at least two contain in at least one of the radicals A and A' at least one ether group.

2. A dye mixture as claimed in claim 1 containing three dyes of the formulae
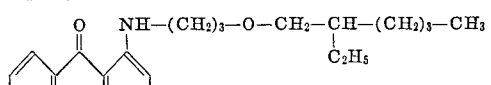
(IV)
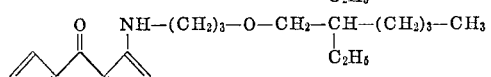
(V)
and
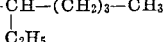
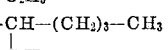
(VI)
3. A dye mixture as claimed in claim 1 containing six dyes of the formulae
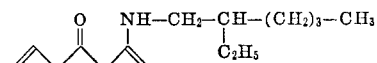
(IV)
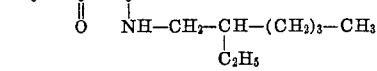
(V)
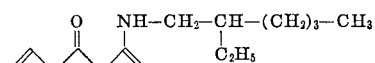
(VI)
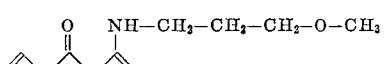
(VII)
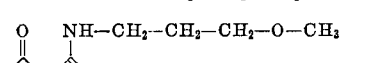
(VIII)
and
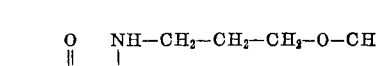
(IX)
References Cited
UNITED STATES PATENTS
3,164,449  1/1965  Buxbaum ............ 44—59
3,435,054  3/1969  Kranz et al. ........ 260—378
FOREIGN PATENTS
452,421  8/1936  Great Britain ........ 260—378
JAMES E. POER, Primary Examiner
J. V. HOWARD, Assistant Examiner
U.S. Cl. X.R.
44—59; 260—378

PO-1050
(5/69)

UNITED STATES PATENT OFFICE
CERTIFICATE OF CORRECTION

Patent No. 3,597,254      Dated August 3, 1971

Inventor(s) Fritz Graser and Guenther Riedel

It is certified that error appears in the above-identified patent and that said Letters Patent are hereby corrected as shown below:

Column 10, Claim 3, Formula IX, that portion of the formula reading "O-CH" should read -- O-$CH_3$ --.

Signed and sealed this 21st day of March 1972.

(SEAL)
Attest:

EDWARD M. FLETCHER, JR.      ROBERT GOTTSCHALK
Attesting Officer      Commissioner of Patents